United States Patent
Kaufmann

(10) Patent No.: US 10,506,409 B2
(45) Date of Patent: Dec. 10, 2019

(54) SYSTEMS AND METHODS FOR BRUSH FIRE COMMUNICATION

(71) Applicant: CartaSense Ltd., Petah Tikva (IL)

(72) Inventor: Yaron Kaufmann, Tel-Aviv (IL)

(73) Assignee: Cartasense Ltd, Petah Tiqwa (IL)

( * ) Notice: Subject to any disclaimer, the term of this patent is extended or adjusted under 35 U.S.C. 154(b) by 0 days.

(21) Appl. No.: 15/504,026

(22) PCT Filed: Sep. 9, 2015

(86) PCT No.: PCT/IB2015/056889
§ 371 (c)(1),
(2) Date: Feb. 15, 2017

(87) PCT Pub. No.: WO2016/042440
PCT Pub. Date: Mar. 24, 2016

(65) Prior Publication Data
US 2018/0302776 A1 Oct. 18, 2018

(51) Int. Cl.
H04W 4/00 (2018.01)
H04W 4/90 (2018.01)
G06Q 10/08 (2012.01)
H04B 17/318 (2015.01)
H04W 84/18 (2009.01)

(52) U.S. Cl.
CPC ............ H04W 4/90 (2018.02); G06Q 10/083 (2013.01); G06Q 10/087 (2013.01); H04B 17/318 (2015.01); H04W 84/18 (2013.01)

(58) Field of Classification Search
CPC ...... H04W 4/90; H04W 84/18; H04B 17/318; G06Q 10/083; G06Q 10/087
See application file for complete search history.

(56) References Cited

U.S. PATENT DOCUMENTS

| 4,589,075 | A | * | 5/1986 | Buennagel | H02J 13/0075 340/12.5 |
| 5,974,236 | A | * | 10/1999 | Sherman | H04W 40/125 709/221 |
| 8,301,180 | B1 | * | 10/2012 | Gailloux | H04W 4/14 455/412.1 |
| 8,812,624 | B2 | * | 8/2014 | Stransky | H04L 29/06 709/220 |
| 2012/0026008 | A1 | * | 2/2012 | Coleman | G08B 21/0227 340/870.15 |

(Continued)

Primary Examiner — Khai M Nguyen
(74) Attorney, Agent, or Firm — Reches Patents

(57) ABSTRACT

Various embodiments of systems and methods for communication in brush fire networks, particularly for the management of inventory of physical items during the time such items are in transport from one location to another. Various embodiments include systems and methods for roll call of the physical items, and for identification and management of events occurring to the physical items. Various embodiments include a loader operating with the brush fire network, in which the loader can identify the numbers or other identifications of physical items, and in which the loader has one or more modules for communicating with both the brush fire network and an information network. Alternative embodiments present systems and methods for managing the inventory of physical items located at fixed locations.

19 Claims, 16 Drawing Sheets

(56) References Cited

U.S. PATENT DOCUMENTS

2012/0039177 A1\* 2/2012 Kubisch ............... H04W 8/005
  370/241
2012/0077513 A1\* 3/2012 Rizzello .................. G01S 5/14
  455/456.1

\* cited by examiner

SYSTEMS AND METHODS FOR BRUSH FIRE COMMUNICATION

BACKGROUND

Systems and networks that transport physical items suffer continuing problems with inventory management. Such physical items may be packages, parts, automobiles, items of furniture, pharmaceuticals, fruit and vegetable produce, meat, and many other types of physical items. Two particular problems are suffered by such systems and networks. First, the ongoing inventory is not updated in a timely manner. In many systems, account is taken of particular items that are intentionally removed from the inventory, but an ongoing count is not taken in real-time for items that are accidentally taken, that accidentally fall away, that are stolen from inventory, or that are added to inventory for various reasons. Second, events of various kinds may happen to items in the inventory, including damage from heat, moisture, gas level, or many other possible causes. Such events are not identified, recorded, and communicated in real-time. The occurrence of such events may require that certain corrective actions be taken, or that the order of planned actions be altered, but without real-time information, these actions cannot be taken or altered.

SUMMARY

Described herein are systems and methods for brush fire communication.

One embodiment is a method for a roll call in a brush fire communication. In one particular embodiment, a first communication node in the network initiates a roll call message in which the roll call message includes identification of the first communication node. Also in this particular embodiment, a second communication node receives the roll call message from the first node. Also in this particular embodiment, the second node attaches its identification to the roll call message and then retransmits the message.

One embodiment is a method for communicating an event in a brush fire network. In one particular embodiment, a first communication node experiences an event, records the event in a general event log maintained by that node, and then transmits a message describing the event together with an identification of the node. Also in this particular embodiment, a second communication node receives the transmitted message describing the event, records the message in a general event log maintained by the second node, adds an identification of the second node, and retransmits the message describing the event together with the identifications of both the first and second nodes.

One embodiment is a loader configured to operate in a brush fire communication network. In one particular embodiment, the loader includes a module operative to recognize an identification associated with a package or other physical item, a module operative to receive a communication transmitted by a communication node, and a module operative to retransmit a communication to an information network that is separate from the brush fire communication network. In various alternative embodiments, the recognizing of identifications may be by OCR, bar code recognizing, IR recognizing, receiving EM pulses, receiving an audio signature, or any other means to obtain identification information from a physical item. In various alternative embodiments, the loader is in two-way communication with the information network, and may therefore transmit messages to the information network as well as receive messages from the information network.

In various alternative embodiments, the loader is in two-way communication with one or more communication nodes, and may transmit messages to a communication node. One example of a message to be transmitted is, "a certain item has been added to inventory". In this example, the communication nodes will understand that the addition to inventory is not an "event", and will therefore not initiate communication of an event. Similarly, if the loader transmits the message, "a certain item has been taken from inventory", the communication nodes will understand that the taking from inventory is not an "event", and will therefore not initiate communication of an event. In both of these examples, the message transmitted by the loader may be acknowledged by one or more communication nodes.

One embodiment is a method for locating a specific node in a brush fire communication network that has multiple communication nodes. In one particular embodiment, a loader initiates a location event for a specific node, the specific node receives notice of the location event, the specific node then responds to the notice of location event, the loader then receives the response of the specific node, and a person holding the loader then moves in the direction of the specific node. In alternative embodiments, the loader is not held by a person, but the loader moves according to an automated or robotic method. In other alternative embodiments, the loader is not held by a person, but a person monitors the loader and remotely controls the movement and direction of the loader.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Definitions

Figure 1:
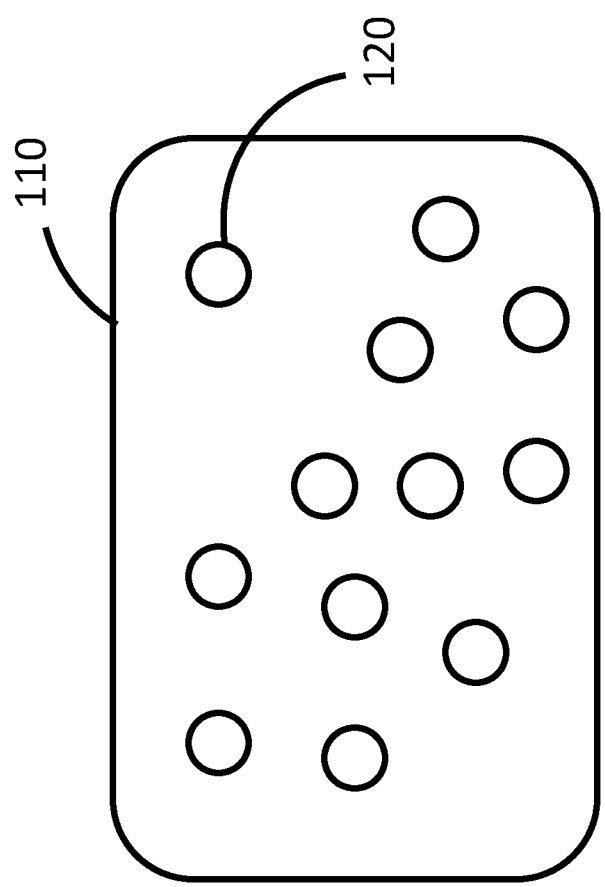
FIG. 1 illustrates one embodiment of a brush fire communication system, with multiple communication nodes within a defined area.

As used herein, "brush fire communication network" is a combination of two or more communication nodes functioning as a leaderless and ad hoc wireless, network. The network is "leaderless" in that no communication node leads any other, and there is no central transceiver. The network is "ad hoc" in that communications are established on a temporary basis between various nodes that happen at a particular time to be in proximity to one another. The network is called "brush fire" to reflect the manner in which a transmission, roll call, event, or other transmission message spreads throughout the various nodes of the network, from an initiator to one or more receiving nodes, and then from each of the receiving nodes to additional receiving nodes, in which any receiving node may hear both the original transmission by a first node and one or more retransmissions.

As used herein, "network group" is a communications network that acts as a brush fire communication network, but that is not temporary or ad hoc, but rather persistent from one situation to another. For example, nodes in a truck may form a brush fire communication network in an ad hoc manner while they are on the truck. If the units are then transferred to a warehouse, in some embodiments the network will terminate, but in other embodiments the members of the group still communicate with one another and can still identify one another as members of the original group. The persistent group, now transferred to a warehouse, is a "network group". In some embodiments, a loader may reconfigure network group membership such that nodes can be added or removed from the network group. In some embodiments, multiple network groups can be merged with one another, or associated without a merger.

As used herein, "communication node", or simply "node", is a combination of hardware and software that includes a computing element, power source, an antenna, and a transceiver unit. In some embodiments, a communication node is part of a brush fire network. In some embodiments, the node is connected to one or more sensors. In some embodiments, the sensors are enclosed within a single enclosure with the node. In embodiments with a sensor, the sensor is a tangible entity that measures some physical property such as location, temperature, gas level, relative gas level, humidity, acidity, motion, light, vibration, shock, electrical properties, EM properties, or other physical or chemical properties. In various embodiments, a sensor may be connected to a node by physical wire or by a bus. Multiple sensors may be connected to one node, in which case the measurement of one element may or may not impact the measurement of another element for purposes of triggering an event.

A communication node responds to events. In some embodiments, the response includes recording information related to the event, and retransmitting information related to the event. In some embodiments, the retransmitted event information may be modified by the communication node.

As used herein, "known location node" is a communication node that is located at a known location within a communication network. In various embodiments the location is known because the loader pings some of the nodes and records its identity and location. In various embodiments the location is known because it is the nodes are located at fixed locations.

As used herein, "roll call" is the act of collecting the identities of a plurality of nodes, for example by name or number. Examples of roll call include transmission of identities at a fixed time, or at a fixed location, or in response to an inquiry sent to one or more nodes. Roll calls may be initiated at various times or events, according to various embodiments. For example, a roll call may be initiated at a certain event, such as at the loading of a truck that includes communication nodes. For example, a roll call may be initiated at a certain event, such as the time that a truck arrives at a particular milestone in its journey. A roll call may be initiated at a time t2 after an event has occurred. A roll call may be initiated by a request, or by some predetermined event, such as, for example, the weakening, beyond a threshold, of the battery connected to a communication node. In various of the embodiments described herein, one or more communication nodes are in communicative contact with one or more packages. As examples, (1) a node and a package may be in direct physical contact; (2) A node may be inside a package, or vice versa; (3) A node and a package may be connected by some cord, line, or other physical connector; (4) A node and package may be free standing from one another, but in wireless communicative contact; and/or (5) some combination of the preceding contacts. It is understood that in a truck, warehouse, or other environment containing one or more communication nodes and one or more packages, any or all or some combination of the examples of contact may be present within the environment.

As used herein, "identification of a node" is a number, name, character string or other marker that is associated exclusively with one node.

As used herein, "to record" is when certain key parameters of a transmission are kept in memory of a node. Some of the transmission parameters that might be kept in memory are received strength of signal, time stamp of transmission, identity for example by name or number of transmitter, and a communication route of a received transmission. A communication route of a received transmission includes the original transmitter of a transmission and a list of nodes that received and retransmitted the original transmission. In some embodiments, key parameters of the message may also be recorded, such as the nature or type of event transmitted. In some embodiments, key parameters are kept in memory of multiple nodes, but different nodes keep in memory different parameters.

As used herein, "general log of communications by the node" is the log created and maintained by a specific node that includes the communications of roll call messages and event messages, that have been received by that node or that have been transmitted by that node. In some embodiments, the general log may be modified. For example, a single event message received from multiple transmissions may be recorded only as one message with a list of the transmitting nodes. For example, a record of communication may be deleted after a certain time period. For example, a record of communication may be deleted after the record has been communicated to a loader.

As used herein, "a change in the general roll call log" is a change in a communication node's general roll call log between a current roll call and an immediately preceding roll call. For example, one change is when an immediately preceding roll call included a particular node that no longer appears in the current roll call. For example, one change is when the current roll call includes a node that did not appear in the immediately preceding roll call. In some embodiments, "a change in the general roll call log" is a change in a communication node's general roll call log between a current roll call and a preceding roll call.

As used herein, "local group roll call log" is a general roll call log of a node plus information about the proximity of other nodes. In some embodiments, the information about the proximity of other nodes is the signal strength of transmission received by the node from the other nodes. Differences in signal strength allow the node to make inferences about the distance between the receiving node and the transmitting node of a communication. In some embodiments, the node will identify proximity of other nodes based on their signal time of flight or other methods known in the art, and define them as a local group.

As used herein, "general event log" is a list of communications describing events that are received and transmitted by a specific communication node in the network. Each node creates and maintains its own general event log. In some embodiments, the "general event log" includes roll calls received and transmitted by the specific communication node.

As used herein, "local group event log" is a general event log of a node plus information about the proximity of other nodes. In some embodiments, the information about the proximity of other nodes is the signal strength of transmission received by the node from the other nodes. Differences in signal strength allow the node to make inferences about the proximity of the distance between the receiving node and the transmitting node of a communication. In some embodiments, the node will identify proximity of other nodes based on their signal time of flight or other methods known in the art.

As used herein, a "sensor" is a unit that measures some physical property related to items in the inventory, to the environment of the items in the inventory, to the storage facility or to the node itself. Such physical property may be, for example, heat, moisture, gas level, relative gas level, sound, light, electromagnetic radiation, motion, vibration, and other physical characteristics. In some embodiments, each sensor is communicatively connected to a communication node. In some embodiments, a sensor may be communicatively connected to multiple communication nodes.

As used herein, a "sensor recording log" is a log of measurements made or received by a sensor.

As used herein, an "event in a brush fire communication network", or simply an "event", include incidents that indicates some kind of change of status of a node or of a physical property sensed or measured by a sensor. Examples include a change in any of the physical properties measured by sensors. Other examples include the opening of a door or other part of a closed space. Other examples include changes in power level or other properties of the node, or of the sensor. A node with 90% loss of power is an example of a change in power level. A malfunction of the node such that it does not receive messages is an event. In some embodiments, a "cannot receive" event is triggered by a node that notices that it receives no echoes to its transmissions. In some embodiments, the passage of time, measured by the node's timer, triggers an event. If a node is expected to be at a certain location within a specified time range, and is not at that location within the specified time range, this is also an event. In some embodiments, receiving a transmission is an event. In some embodiments, the passage of a predetermined amount of time is an event.

As used herein, "roll call event" is an event initiated by a communication node identifying a change in the roll call log.

As used herein, to "record" an event is to make an electronic note of the information received about the event. When a loader "records" a transmission from a communication node, the loader records the information received. In some embodiments, a loader will not record information received if the information exactly duplicates information that the loader has already received from a different communication node.

As used herein, "similar-type event" is an event of a certain kind that is experienced by multiple nodes within the system, or that is measured by sensors attached to multiple nodes within the system. As one non-limiting example, if multiple sensors measure a rapid increase in the level of humidity, each sensor will report this measurement to the communication node to which it is connected. The first unit transmitting this event will report it as an ordinary event rather than a similar-type event, but each subsequent node retransmitting the message that has had a similar event, and has not transmitted it yet, will report the message as a similar-type event. Any property measured by sensors or change of status of a node can trigger a similar-type event.

As used herein, "a node experiences an event" when the node receives a notice of event from a sensor, or when a change occurs to the node itself, for example, from a sensor that is communicatively connected to it.

As used herein, "loader in a brush fire communication network", or simply "loader", is a communication unit that can receive roll call, event and other information such as information recorded in logs, from one or more communication nodes. In some embodiments, the loader receives sensed data, as sensed or processed, from a communication node. The recognizing of node identifications may be by OCR, bar code recognizing, IR recognizing, receiving EM pulses, receiving an audio signature, or any other means to obtain identification information from a physical item.

As used herein, "loader accepting a communication" occurs after the loader receives a transmission. In some embodiments, if the information in the transmission is new, the loader will record and/or relay the communication to an information network. In some embodiments, if the information is not new, the loader will not record or retransmit the communication. In some embodiments, the loader processes the information received in a transmission. In some embodiments, the loader integrates the information received from multiple transmissions. In some embodiments, the loader transmits a message derived from the information received in a transmission.

As used herein, "real-time" is action that is taken at the time of the event or soon after the event becomes known. If some kind of corrective action is required in real-time due to an event, the correction action will be taken as soon as the event is known. "Real-time communication" is communication of an event immediately or soon after the event becomes known.

Figure 2:
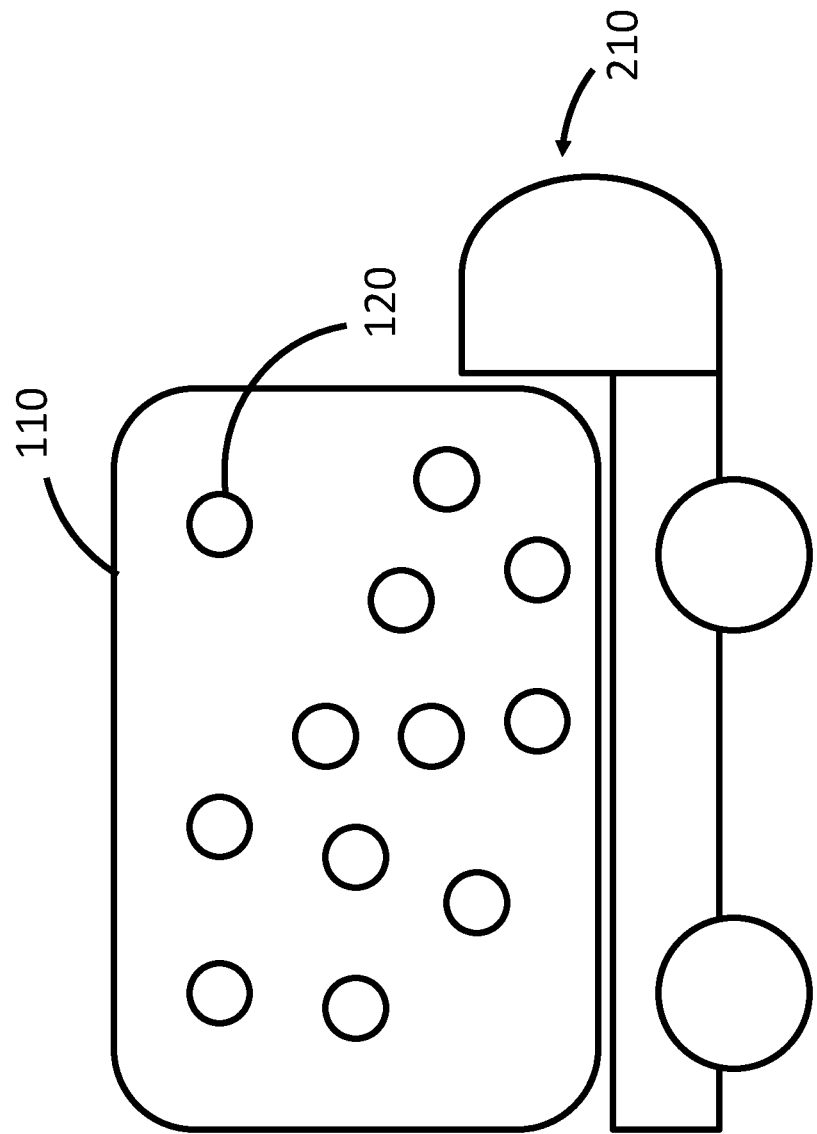
FIG. 2 illustrates one embodiment of a brush fire communication system, with multiple communication nodes within a defined area mounted upon a platform capable of moving such as a vehicle. In various embodiments, the platform may be in motion while the communication nodes communicate. In other embodiments, the platform may be temporarily or permanently stationary.
Figure 3:
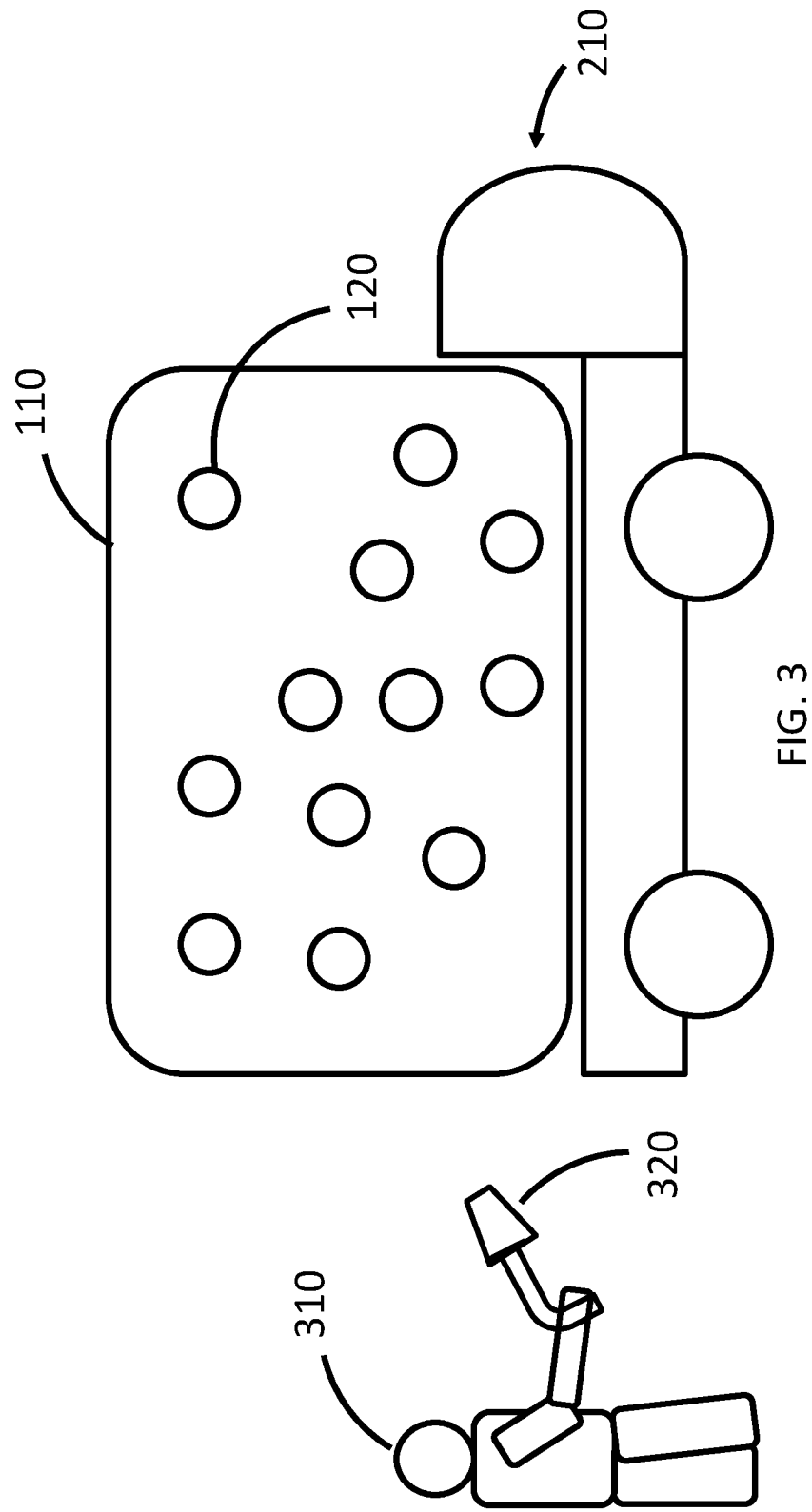
FIG. 3 illustrates one embodiment of a brush fire communication system, with multiple communication nodes within a defined area mounted upon a platform capable of moving such as a vehicle, and a handheld loader. In various embodiments, the platform may be in motion while the communication nodes communicate. In other embodiments, the platform may be temporarily or permanently stationary.
Figure 4:
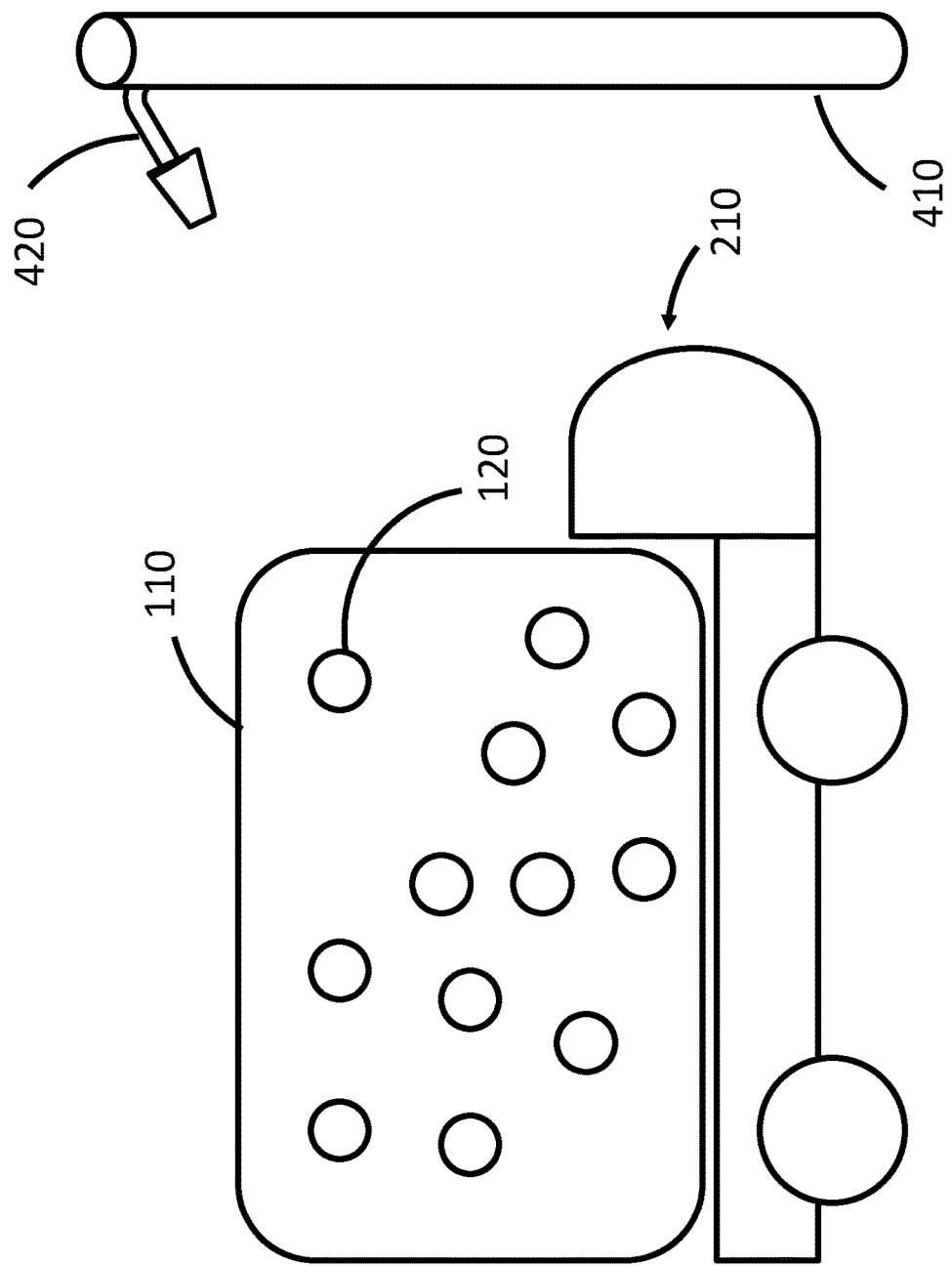
FIG. 4 illustrates one embodiment of a brush fire communication system, with multiple communication nodes within a defined area mounted upon a platform capable of moving, such as a vehicle, and a fixed communication point including a loader unit. In various embodiments, the platform may be in motion while the communication nodes communicate with the loader. In other embodiments, the platform may be temporarily or permanently stationary.

As used herein, "vehicle" may be a motorized transport such as a truck or an automobile, as shown in FIGS. 2, 3, and 4. However, "vehicle" also includes other forms of transportation, such as a railroad car, a ship, a plane, an underwater transporter, or any other physical entity that may be used for transporting persons or objects.

FIG. 1 illustrates one embodiment of a brush fire communication system, with multiple communication nodes within a defined area. FIG. 1 shows an enclosed area 110, which encompasses two or more communication nodes 120.

FIG. 2 illustrates one embodiment of a brush fire communication system, with multiple communication nodes within a defined area mounted upon a moving platform such as a vehicle. FIG. 2 shows communication nodes 120 in an enclosed area 110 as illustrated in FIG. 1, in which the enclosed area 110 has been mounted on a moving platform 210.

FIG. 3 illustrates one embodiment of a brush fire communication system, with multiple communication nodes within a defined area mounted upon a moving platform such as a vehicle, and a handheld loader. FIG. 3 shows, in addition to the moving platform 210 of FIG. 2, a person 310 holder a loader unit 320.

FIG. 4 illustrates one embodiment of a brush fire communication system, with multiple communication nodes within a defined area mounted upon a moving platform such as a vehicle, and a fixed communication point including a loader unit. FIG. 4 shows, in addition to the moving platform 210 of FIG. 2, a fixed structure 410 upon which is mounted non-portable loader unit 420.

Figure 5:
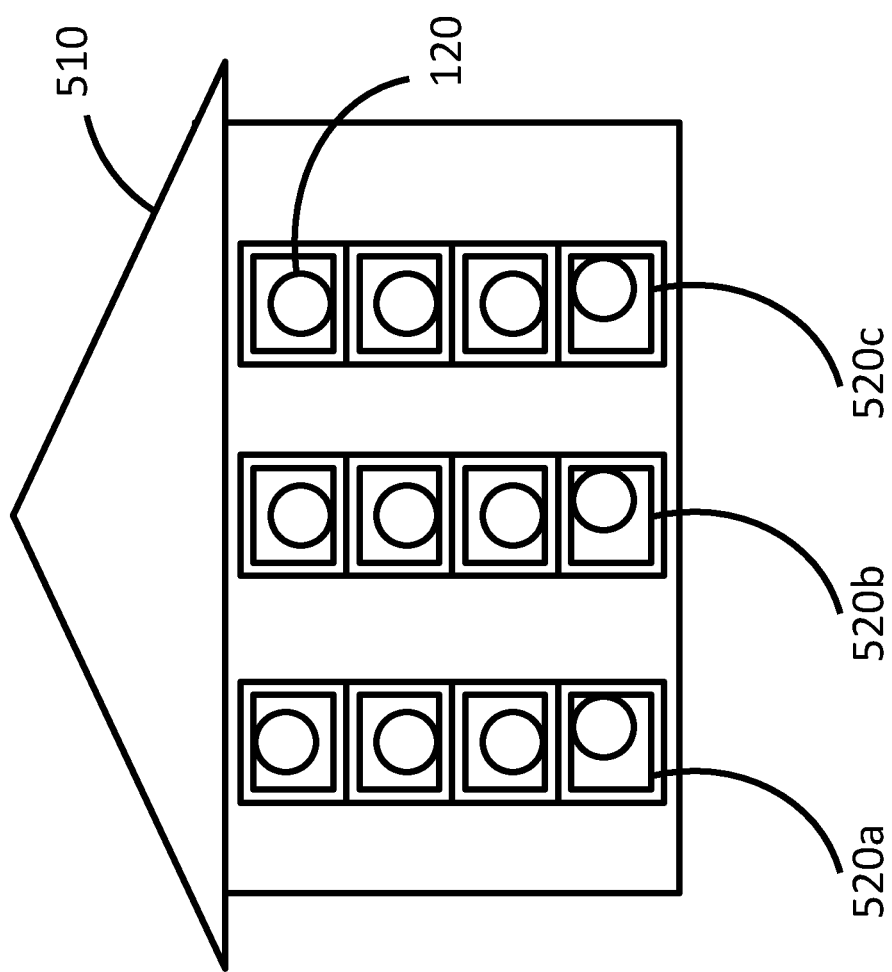
FIG. 5 illustrates one embodiment of a brush fire communication system included within a building such as a warehouse.

FIG. 5 illustrates one embodiment of a brush fire communication system included within a building such as a warehouse. FIG. 5 shows a building 510 such as a warehouse, factory, office, or the like. There are one or more racks 520a, 520b, and 520c within the building 510, each rack includes one or more communication nodes 120.

Figure 6:
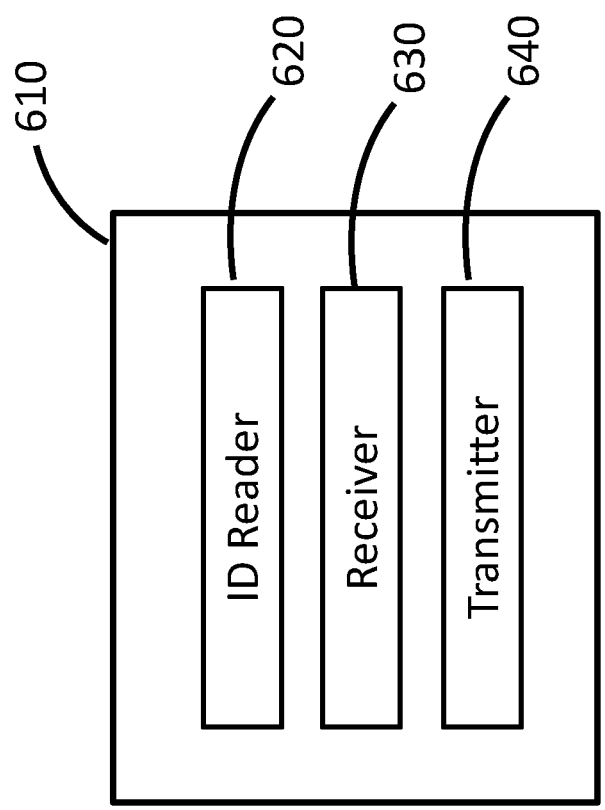
FIG. 6 illustrates one embodiment of a loader in a brush fire communication system.

FIG. 6 illustrates one embodiment of a loader in a brush fire communication system. FIG. 6 shows a loader 610, including an ID reader 620, a receiver 630 to receive messages, and a transmitter 640 to transmit messages.

In one alternative embodiment, the ID reader is a module that recognizes the identification of a package.

In one alternative embodiment, the loader includes a module that reads and understands received messages.

In one alternative embodiment, the module that reads and understands received messages is integrated within other modules.

In one alternative embodiment, the reader is a module that both recognizes the identification of a package, and also reads and understands received messages.

In one alternative embodiment of the loader, the loader is a handheld unit that is held and activated by a person.

In one alternative embodiment of the loader, the loader is a handheld unit that held by a person, but that is activated automatically when the loader comes within a predefined distance of an active communication node in a brush fire communication system. For this purpose, "active" means that a communication node has been turned on and is operating. In this embodiment, both the loader and the communication node are capable of moving, so that the predefined distance may be achieved by movement of the loader, or by movement of communication nodes, or by movement of both the loader and communication nodes. In some embodiments, the loader is activated automatically when the loader comes within a predefined distance of an active communication node.

In one alternative embodiment of the loader, the loader is attached to a fixed structure, and the unit is activated automatically when the loader comes within a predefined distance of an active communication node in a brush fire communication system. For this purpose, "active" means that a communication node has been turned on and is operating. In this embodiment, only the communication node is capable of moving, so that the predefined distance is achieved when at least one communication node moves within the predefined distance.

In one alternative embodiment of the loader, the loader is attached to a vehicle, and the unit is activated automatically when the loader comes within a predefined distance of an active communication node in a brush fire communication system. For this purpose, "active" means that a communication node has been turned on and is operating. In this embodiment, the loader is capable of moving, so that the predefined distance is achieved when the loader moves within the predefined distance of the at least one communication node.

In one alternative embodiment of the loader, the loader and the communication node are capable of moving.

In one alternative embodiment a loader in a brush fire communication network includes a module for recognizing the identification of a package, a module for receiving communications transmitted by a communication node, and a module for retransmitting a communication to an information network.

In one variation of the loader in a brush fire communication network described immediately above, the loader is a handheld unit activated by a human being. In one permutation of such variation, further the loader records a communication transmitted by a communication node only if the loader has not yet received the information in the transmitted communication.

In a second variation of the loader in a brush fire communication network described above, the loader is a handheld unit that activates automatically when the loader is within a predefined distance of a communication node in the network. In one permutation of such variation, further, the loader accepts a communication transmitted by a communication node only if the loader has not yet received the information in the transmitted communication.

In a third variation of the loader in a brush fire communication network described above, the loader is a unit at a fixed location, and the loader becomes operative when a communication node in the network moves to a predefined distance from the loader. In one permutation of such variation, further the loader unit accepts a communication transmitted by a communication node only if the loader unit has not yet received the information in the transmitted communication.

In a fourth variation of the loader in a brush fire communication network described above, the loader is operated by a person located remotely from the loader. In some embodiments, the remotely operated loader is located at a fixed location. In some embodiments, the remotely operated loaded is movable, and will be controlled in an automated or robotic manner.

Figure 7:
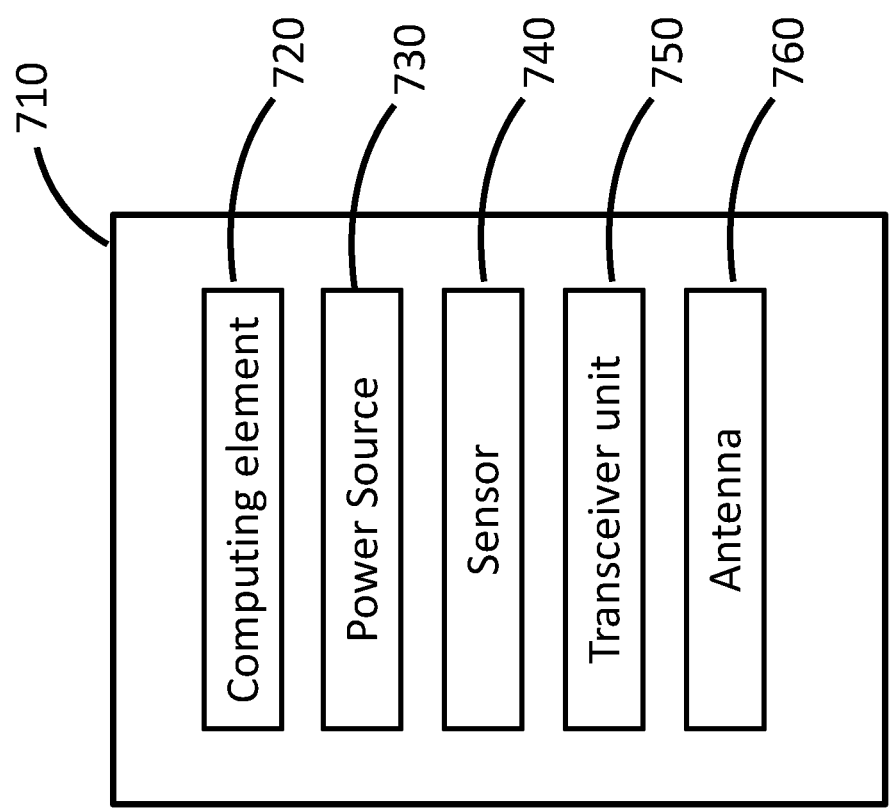
FIG. 7 illustrates one embodiment of a communication node in a brush fire communication system.

FIG. 7 illustrates one embodiment of a communication node in a brush fire communication system. In the embodiment, the communication node 710 includes a computing element 720 to process information received from a received transmission or from a sensor, and/or to process information required to transmit a message from the communication node 710 and/or to perform various types of computations. In one embodiment, the communication node 710 has its own power source 730, but it will be understood that external power sources, such as electricity, are also acceptable as alternative embodiments. In one embodiment, the communication node 710 has a sensor 740 that senses various events in the surrounding area or events that happen to the communication node. In all embodiments, the node 710 has some kind of communication module. In one embodiment illustrated in FIG. 7, the communication node 710 has a transceiver unit 750, although in other embodiments it may have only a transmitter or only a receiver. In one embodiment, the communication node 710 has an antenna 760 that may receive and/or transmit messages.

Figure 8:
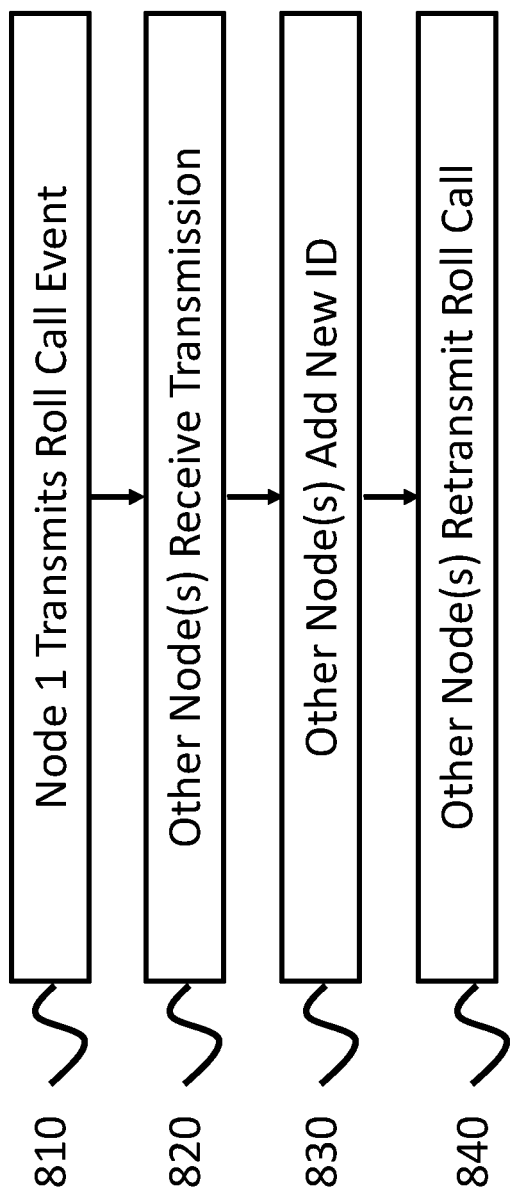
FIG. 8 illustrates one embodiment of a method by which a brush fire communication system conducts a roll call of communication nodes.

FIG. 8 illustrates one embodiment of a method by which a brush fire communication network conducts a roll call of communication nodes. FIG. 8 shows that a first node transmits a roll call event 810, one or more other nodes receive such transmission 820, each of the other nodes that receive the transmission adds its ID to the roll call message 830, and the other nodes than retransmit the roll call message including their own ID attached to the message received 840. In various embodiments, the first node, node 1, transmits the roll call message one time, while in other embodiments the first node transmits the message a fixed number of times greater than one. In some embodiments, node 1 repeats transmission of the roll call message until it receives an acknowledgement that another node has received the transmission. In some embodiments, node 1 repeats transmission of the roll call message until it receives acknowledgements that the transmission has been received by two other communication nodes, or by some number of communication nodes greater than two.

In one alternative embodiment of the method for a roll call just described, the first node initiates a roll call message at a specified length of time, t1, after the first node's last reception of a message from another node in the network.

In one variation of the alternative embodiment just described, further a communication node that initiated the last roll call message in the network waits a period of time t2 before initiating a new roll call message, and time t2 is greater than time t1.

In a second variation of the alternative embodiment described above, further each node in the network creates a general roll call log of communications received and communications transmitted by the node.

In a configuration of the second variation just described, further each node in the network creates a local group roll call log based on that node's general roll call log and on the magnitudes of signal strength of roll call messages received by that node.

In an arrangement of the configuration just described, the magnitude of signal strength of each roll call message received by that node is measured by RSSI.

In a second configuration of the second variation described above, further a communication node identifies a change in the general roll call log, and initiates a roll call event in a response to the identified change.

In an arrangement of the second configuration just described, further the identified change is identification of a communication node that is missing from the most recent roll call but that was present in the immediately preceding roll call.

Figure 9:
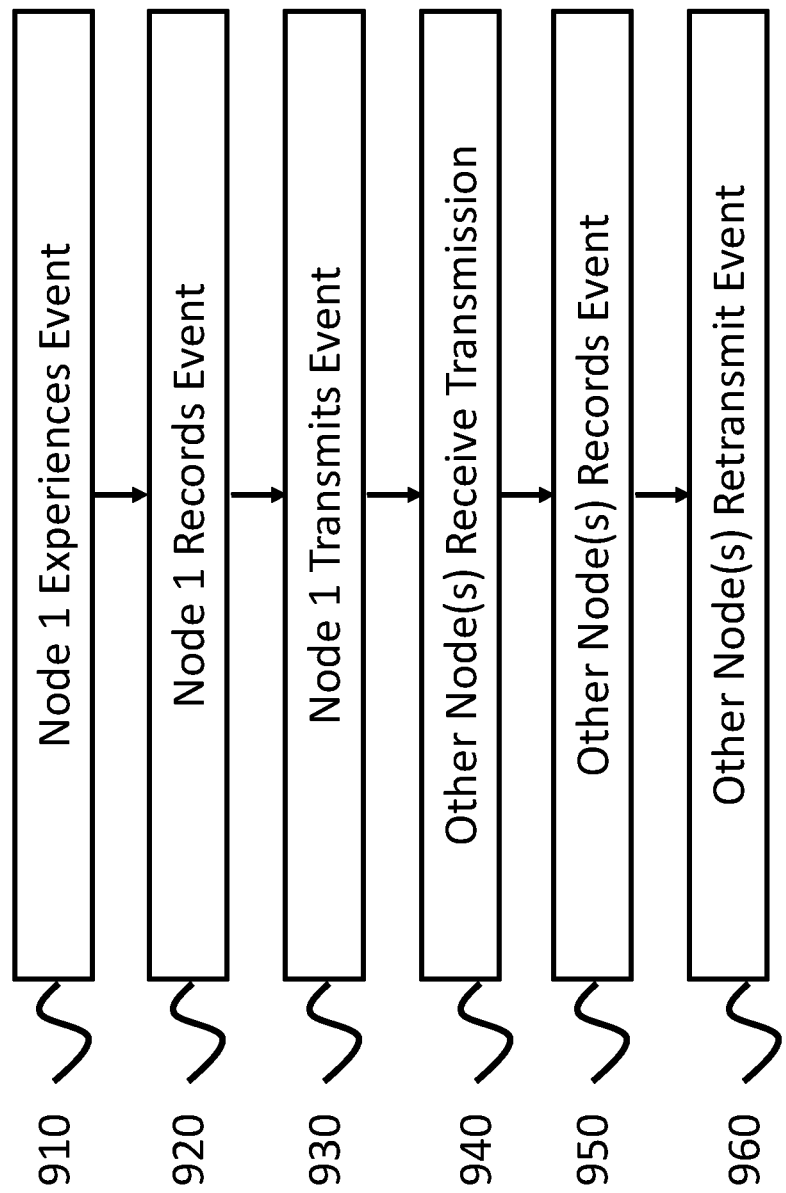
FIG. 9 illustrates one embodiment of a method by which a brush fire communication system responds to an event experienced by one or more of the communication nodes in the system.

FIG. 9 illustrates one embodiment of method by which a brush fire communication system responds to a specific event experienced by one or more of the communication nodes in the system. A first communication node in the network, node 1, experiences an event 910. Node 1 records the event 920 in a general event log maintained by the node. Node 1 then transmits a message describing the event, in which the message includes also identification of node 1 930. A second communication node receives the transmitted message describing the event 940. In some embodiments, two or more other nodes receive the transmitted message. At least one of the nodes receiving the message records the message in a general log maintained by that node 950. At least one of the nodes receiving the message adds its identification to the message, and then retransmits the message including this additional identification 960.

In some embodiments of the method illustrated in FIG. 9, node 1 transmits the event message only one time. In other embodiments, it transmits the event a fixed number of times greater than one. In some embodiments, node 1 repeats transmission of the event message until it receives an acknowledgement that another node has received the transmission. In some embodiments, node 1 repeats transmission of the event message until it receives acknowledgements that the transmission has been received by two other communication nodes, or by some number of communication nodes greater than two.

In one alternative embodiment of the method of responding to a specific event described, further each node in the network creates a general log of communications describing events that are received and transmitted by that node.

In one variation of the alternative embodiment just described, further each communication node in the network creates a local group event log based on that node's general log of communications describing events and on the magnitudes of signal strength of messages describing events that are received by that node.

In a configuration of the variation just described, the magnitude of signal strength of each message describing event that is received by that node is measured by RSSI.

In a second alternative embodiment of the method of responding to a specific event, the event is experienced by only one communication node, that communication node transmits the event, and other communication nodes retransmit the same event.

In one variation of the second alternative embodiment just described, the event is a change in the operational functionality of the communication node transmitting the event.

In a configuration of the variation just described, the event is a declining life of the battery in the communication node transmitting the event.

In a second configuration of the variation described above, the event is a measurement value sensed by a sensor in communicative contact with the communication node transmitting the event.

In a third alternative embodiment of the method of responding to a specific event, the event is a same type event that is experienced by at two or more communication nodes, and each node reports the type event.

Figure 10:
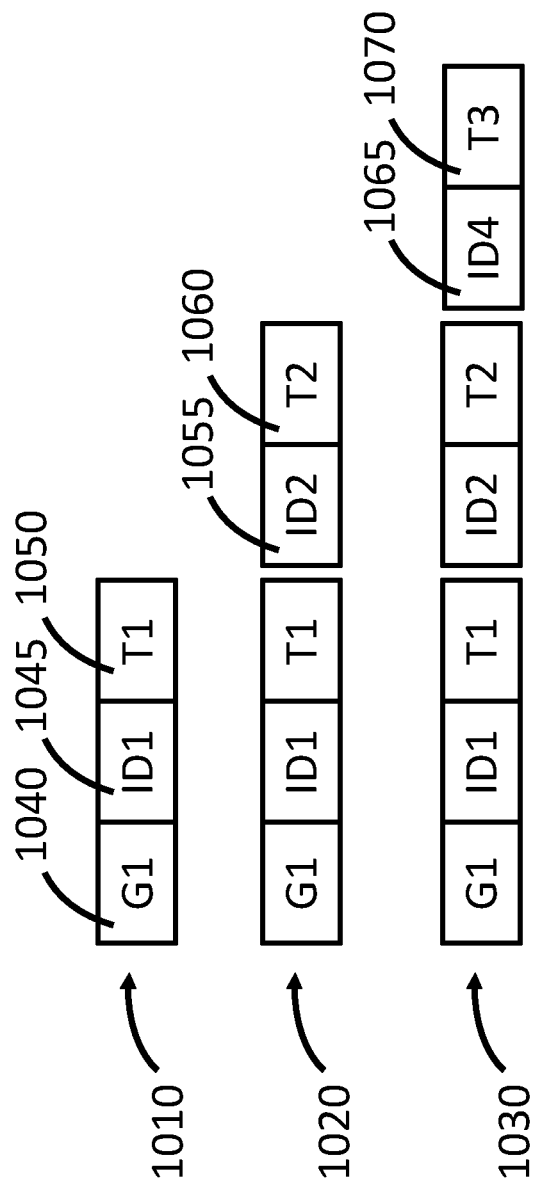
FIG. 10 illustrates one embodiment of a data structure for a roll call in a brush fire communication system.

FIG. 10 illustrates one embodiment of a data structure for a roll call in a brush fire communication system. FIG. 10 shows three general kinds of data within a data structure, which are G(i)—a group of nodes to which the transmitting node belongs, which may be identified by a group identification number, name, symbol, character string or other methods of identification, that identifies the group transmitting; ID(j)—node identification number, name, symbol, character string or other methods of identification, that identifies the node transmitting; and T(k)—time of transmission. In some embodiments, T(k) represents a time value, wherein the time value is related to the transmission time, or to the time when the transmission was received or a time when the sensor recorded an event. The packet may include different time representations.

In a first data structure 1010, the structure includes the group to which a transmitting node belongs G1 1040, and identification for that node ID1 1045, and the time of transmission T1 1050.

In a second data structure 1020, a second node has received the first data structure in a transmission from a first node. The second node now adds its identification ID2 1055, and retransmits the message at time T2 1060, but the retransmission includes both the original data structure and the data added by the second node.

In a third data structure 1030, a third node receives the retransmission from the second node, including all of the data from the first node and the second node. The third node then adds its own identification ID4 1065, and retransmits at time T3 1070.

1010 is an embodiment of a transmission packet transmitted by the roll call initiator.

1020 is an embodiment of a transmission packet transmitted by a node echoing the roll call transmission. It includes the original packet as well as its own ID and time of its transmission.

1030 is an embodiment of a transmission packet transmitted by a node on the $2^{nd}$ echo hop. It includes the transmission packet it receives from 1020 as well as its own ID and time of its transmission.

In various embodiments, a data structure for a roll call in a brush fire communication system will include a subset of: G(i), ID(j) and T(k). For example, in some embodiments a second node will strip off the identification of the first node ID1, so that the new data structure will be a modification of 1020 including G1, T1, ID2, and T2.

Figure 11:
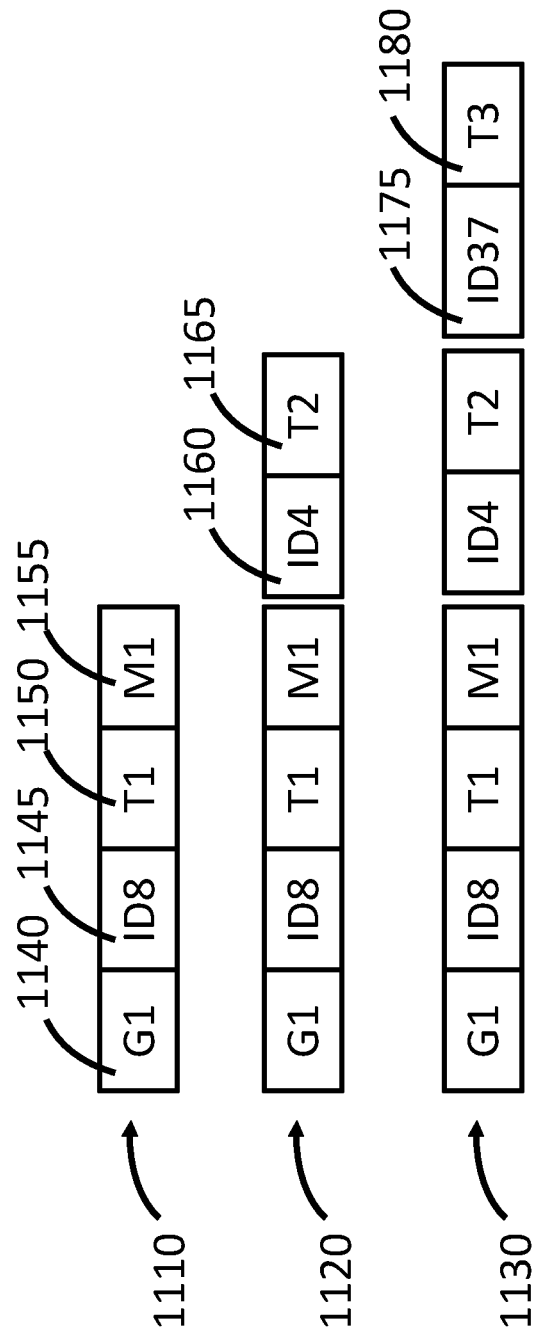
FIG. 11 illustrates one embodiment of a data structure for an event notification in a brush fire communication system, in which a single event is reported by multiple communication nodes.

FIG. 11 illustrates one embodiment of a data structure for an event notification in a brush fire communication system, in which a single event is reported by multiple communication nodes. FIG. 11 shows M1 1155, which is a specific event experienced and reported by node 1.

1110 is an embodiment of a transmission packet transmitted by a node experiencing an event. It includes a group to which the transmitting node belongs G1 1140, the identification of the transmitting node ID8 1145, the time of transmission T1 1150, and the type of event experienced by the node M1 1155.

1120 is an embodiment of a transmission packet transmitted by a node echoing the first transmission and adding to the original packet its identification ID4 1160, and time of transmission T2 1165. In alternative embodiments, 1120 would include in addition the type of event M1 attached at the end of the addition by the second node. This second M1 packet is not shown in FIG. 11.) 1130 is an embodiment of a transmission packet transmitted by a third node on a second echo hop. It includes the transmission packet it receive from 1020 as well as its own identification ID37 1175 and the time T3 1180 of the second echo transmission T3. In alternative embodiments, 1130 would include in addition the type of event M1 attached at the end of the addition by the third node. (This M1 packet would be at the end of 1130 but is not shown in FIG. 11.)

Figure 12:
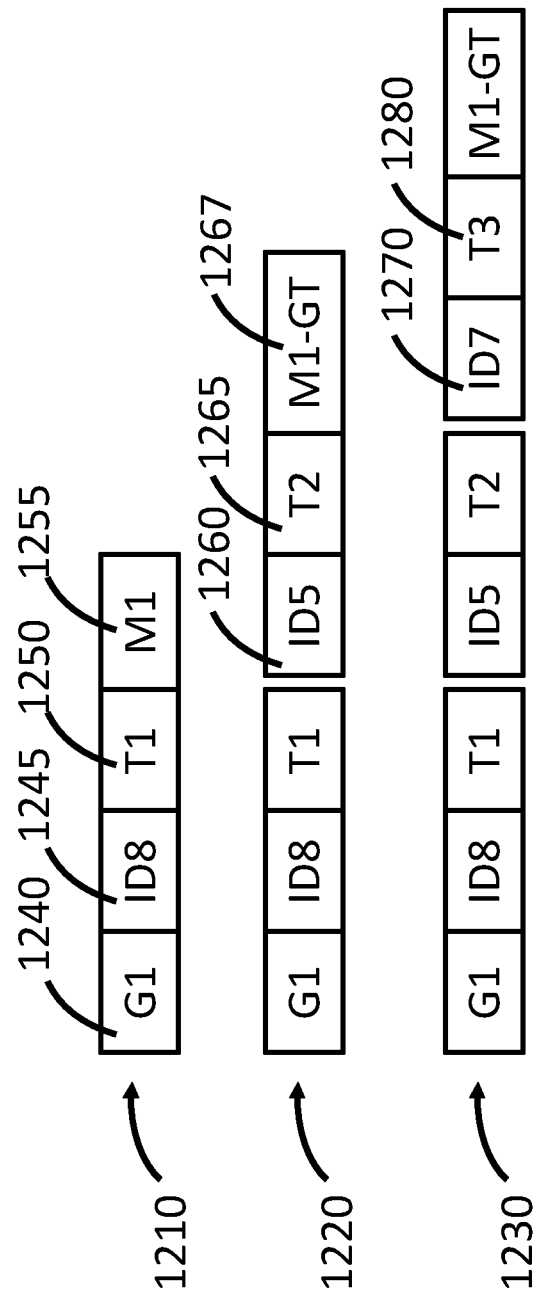
FIG. 12 illustrates one embodiment of a data structure for an event notification in a brush fire communication system, in which multiple nodes report multiple events, but all the events are of the same general type.

FIG. 12 illustrates one embodiment of a data structure for a similar-type event notification in a brush fire communication system, in which multiple nodes report multiple similar-type events, in which all the events are of the same general type. Instead of sending multiple transmissions, one transmission for each event of the same general type, a node rather retransmits a general packet M-GT indicating that the report is a similar-type event. In some embodiments, not shown in FIG. 12, the message M-GT will include a count of the number of similar-type events included in the transmission.

1210 is an embodiment of a transmission packet transmitted by a node experiencing an event. It includes a group to which a first transmitting node belongs G1 1240, identification of the first transmitting node ID8 1245, time of transmission T1 1250, and the message of the event 1 type M1 1255.

1220 is an embodiment of a transmission packet transmitted by a second node that experienced the same type event, echoing the first transmission. The second node adds to the data structure received 1210 its identification ID5 1260, and time of transmission at which the first echo is transmitted T2 1265. The second node also changes the event type M1 to same type event M1-GT 1267.

1230 is an embodiment of a transmission packet transmitted by a third node that experienced the same event type, on the third echo hop. The third node adds to the data structure received 1220 its identification ID 7 1270, and time of transmission at which the second echo is transmitted T3 1280. The third node updates the message of the number of multiple events of the same type event M1-GT.

Figure 13:
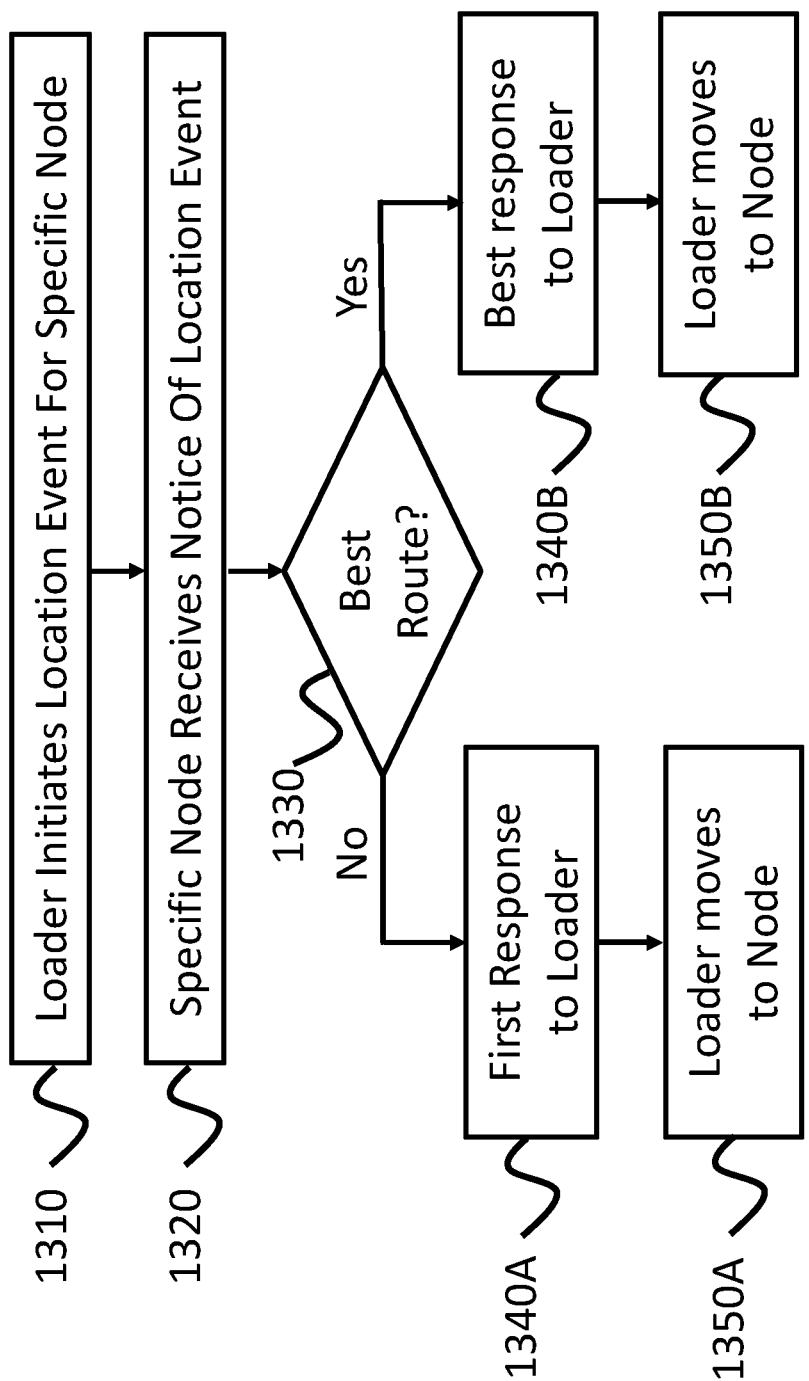
FIG. 13 illustrates one embodiment of a method by which a loader may locate a specific node within the network of communication nodes.

FIG. 13 illustrates one embodiment of a method by which a loader may locate a specific node within a network of communication nodes. A loader initiates a location event for a specific node 1310. The specific node receives a first notice of the location event 1320, together with the route by which the notice came to the specific node. The route is known by the identifications of the nodes that transmitted or retransmitted the notice.

A decision point is then reached 1330. The specific node may react almost immediately by transmitting a message to the loader detailing the path of the first notice. Wherein a person with a loader can approach the specific node by following the first notice path. This decision branch is represented by the "No" in FIG. 13. Alternatively, the specific node may wait a period of time T, during which it receives a second and possibly additional notices of the location event, wherein each such subsequent notice arrives at the specific node by a route different from the path of the first notice. In such case, the specific node determines which of the paths received is the "best route" for a person with a loader to approach the specific node.

The "best route" can be determined by an algorithm that includes various factors such as robustness of communication route from the node to the loader, membership of the node in a specific group or sub-group, minimizing the number of steps or distance to collect all nodes to be collected by the loader, and other factors. For example, a best route may be the least number of nodes in the route, or the maximum overall received signal strength of transmissions in the route, or a route that has no weak received signal strengths.

If the answer is No, then the specific node transmits to a loader a response with the first route received 1340A. A person with the loader than approaches the specific node by this first route 1350A.

If the answer is Yes, then the specific node selects the best route and transmits to a loader that best route 1340B. A person with the loader then approaches the specific node by his best route.

Figure 14A:
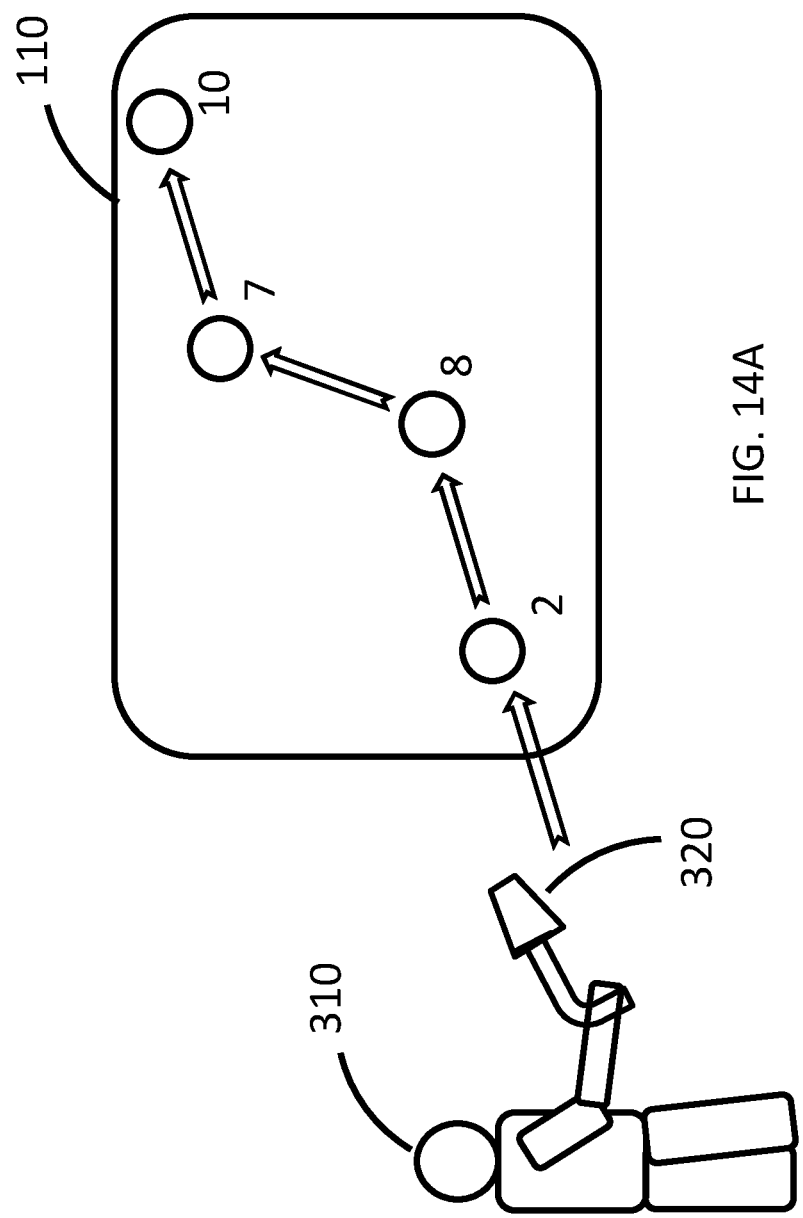
FIG. 14A illustrates one embodiment of a method by which a person with a loader may move toward a specific node within the network of communication nodes.

FIG. 14A illustrates one embodiment of a method by which a person 310 with a loader 320 may move toward a specific node 10 within the network of communication nodes. FIG. 14A shows an enclosed area 110 with a communication network of nodes. A person 310 with a loader 320 approaches a specific node 10. The person 310 approaches by a route with nodes 2, 8, 7, and 10. This specific route may have been the route in the first notice of a location event received by node 10. This route might also be the best route received by node 10, since there is no indication in FIG. 14A whether the specific route is a first route or a best route. In some embodiments, as the person 310 approaches each node in the route, the loader 320 will ping that node to verify a certain level of received signal strength in response. If the response signal is sufficiently strong, the person 320 will continue in that route, and if not, the person will alter the route for example by initiating another location event for node 10 from its current position.

In some embodiments, the loader pings multiple nodes in the network, prior to initiating the location event. The pinged nodes ID and location are therefore known and the nodes become "known location nodes". In some embodiments, the loader will ping multiple nodes in the network that are located in key locations. Key locations are locations that will potentially facilitate shortening of routes identified during location events. The key locations include locations on the perimeter of the network, in the center of the network, as well as near visible landmarks in the area that the network is spread out in, such as a door, window or wall. In some embodiments, the known locations nodes are nodes that are visibly different than other nodes, such as nodes related to very large, differently shaped or colored packages.

Figure 14B:
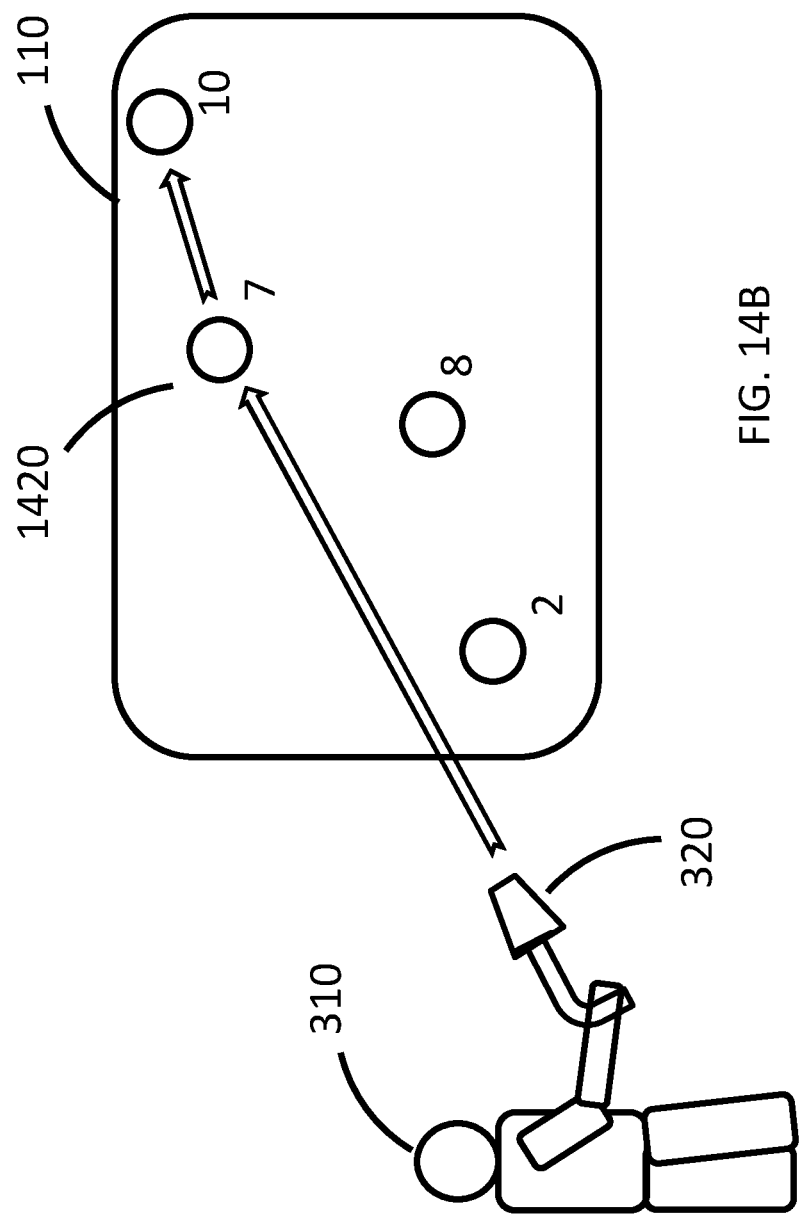
FIG. 14B illustrates a second embodiment of a method by which a person with a loader may move toward a specific node within the network of communication nodes.

FIG. 14B illustrates a second embodiment of a method by which a person 310 with a loader 320 may move toward a specific node 10 within the network of communication nodes. In FIG. 14B, the person had identified node 7 prior to initiating the location event for node 10. The person does not go to the closest node 2, but rather bypasses both node 2 and node 8, moving directly to known location node 7 and then to node 10. This route has fewer nodes than the route illustrated in FIG. 14A, and also a shorter absolute distance to travel than the route illustrated in FIG. 14A. The route in FIG. 14B may be a best route determined by specific node 10. In some embodiments, as the person 320 approaches each node in the best route, the loader 320 will ping that node to verify a certain level of received signal strength in response. If the response signal is sufficiently strong, the person 310 will continue in that route, and if not, the person will alter the route.

Figure 15:
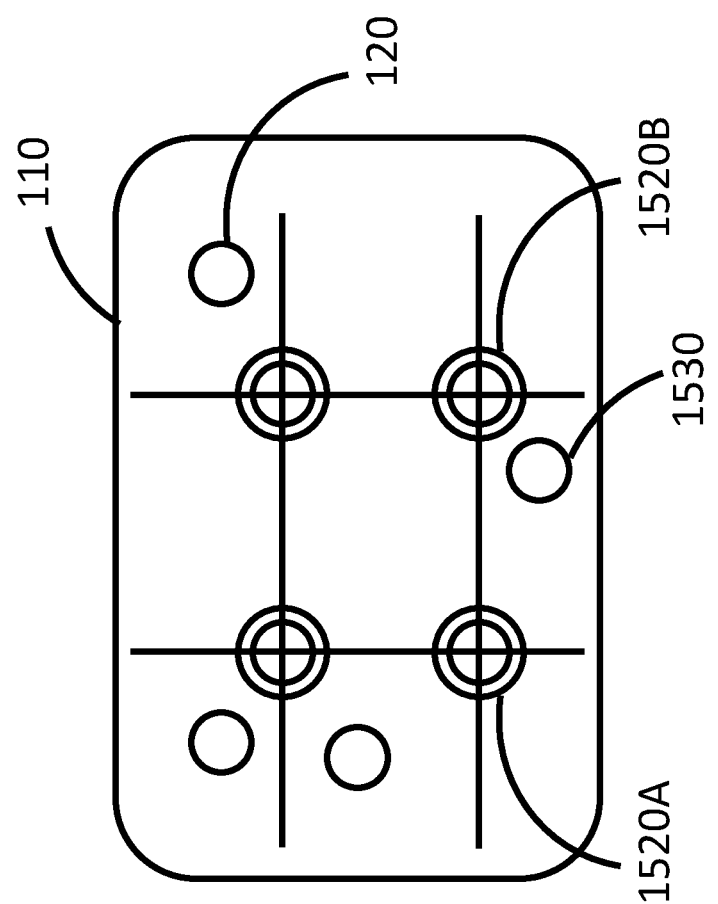
FIG. 15 illustrates one embodiment of a system of communication nodes including one or several known nodes placed at various fixed locations within the system. Each specific node and its location may be known in advance of any communication within the system, and this knowledge may be used to increase the efficiency by which specific communication nodes will be located.

FIG. 15 illustrates one embodiment of a communication network including several known location nodes placed at various locations within the communication network. The location of the known location node may be known in advance of any communication within the system, and this knowledge may be used to increase the efficiency by which specific communication nodes will be located. In FIG. 15, there is a communication network of node within an area 110. The network includes two or more ordinary nodes 120. The network further includes one or more known location nodes which function like the other nodes, but whose location is known—these are represented as 1520A and 1520B, but it is understood that there may be more than two such nodes, or there may be only one such node. Since the location of these known location nodes within the area 110 is known in advance, transmissions from these nodes may be used to more rapidly locate objects within the area 110. For example, a loader initiates a location event for node 1530. Node 1530 reacts almost immediately by transmitting a message to the loader detailing the path of the first notice. Further to this transmission, node 1530 monitors that echoes of its transmission, recording the RSSI levels of known location nodes. In the example if FIG. 15, node 1530 sends a follow-up notice to the loader indicating that it is closer to known location node 1520B then to 1520A and further away from the other known location nodes. The additional information can further guide the person with loader toward node 1530.

In some embodiments of the network illustrated in FIG. 15, a specific node 1530 within the network may be located according to a search within a specific area of the network. In some embodiments, the area to be searched is determined with a "best route" algorithm that includes information regarding the known location nodes. Upon initiation of a location event for a specific node, the specific node may wait a period of time T, during which it receives a multiple notices of the location event, wherein each such notice arrives at the specific node by a different route. In some embodiments the different routes include known location nodes. The "best route" algorithm responds with the list of known location nodes that were included in the different routes. In some embodiments, a search area for the specific node can be identified based on the list of known location nodes in the different routes. In some embodiments the "best route" algorithm responds with the list of known location nodes that were included in the different routes and their relative location within the route or distance from the specific node. In some embodiments, the search area can be narrowed based on additional information such as relative location within the route.

In some embodiments, the known location nodes are positioned in fixed locations such as nodes 1520A and 1520B. For example, four known location nodes, positioned in fixed locations are illustrated in FIG. 15. It would be possible to determine that the specific node is within the box formed by the four known location nodes, and this information may quicken the search for the specific node. Alternatively, the specific node may be outside the box. For example, if the specific node sought is 120, the relative signal strengths of messages from each of the known location nodes to specific node 120 will allow specific node 120 to determine relatively easily that it is located outside the box but closest to the known location nodes node in the upper right of FIG. 15. With this information, the area of search can be identified with relative ease, and the specific node may be located relatively quickly. In some embodiments, the search area can be identified with relatively high accuracy. Let us say, for example, that the specific node sought is the node at the bottom middle of FIG. 15, which is node 1530. The four fixed location nodes send messages to node 1530 which indicate that the top two fixed nodes are very far away but specific node 1530 is within the vicinity of nodes 1520A and 1520B. From this alone, it may be determined that node 1530 is not within the box created by the four fixed location nodes, but is rather outside the box but within proximity to 1520A and 1520B. Further, the strengths of transmissions of signals received by 1530 from 1520A and 1520B allow a calculation that distance from 1520A to 1530 is approximately twice the distance from 1520B to 1530. These relative distances allow sensor 1530 to determine with relatively high precision the area in which 1530 is located, and this information will hasten the search by a person with a loader for specific node 1530. The determination of relative distance between 1530 and fixed location nodes may be by received signal strengths, triangulation, geometric location finding, time of arrival for signals, differential phases of arrived signals, direct sequence spread spectrum, frequency hopping spread spectrum, wideband and ultra-wideband technologies, or other known methods for identifying location from one or more electronic signals. More than one such method may be used, and there may be used any other method that improves the locating of relative distances.

One embodiment is method for locating a specific node in a communication network with multiple communication nodes. In one particular form of such embodiment, a loader initiates a location event for a specific node 1310. The specific node receives notice of the location event 1320. The specific node then transmits to the loader a response to the notice, 1340A or 1340B. The loader receives this response, and a person with the loader then moves toward the specific node, 1350A or 1350B. In this particular embodiment, there has been no decision at point 1330, but rather the specific node has responded in a pre-programmed manner.

In an alternative embodiment to the method just described for locating a specific node, further it receive notice of the location event, the specific node determines whether it has been programmed to provide a best route.

In a variation of the alternative embodiment just described, further the specific has been programmed to provide a best route, and the specific node's response to receiving notice of the location event includes sending of a best route.

In a configuration of the variation just described, the best route includes the shortest number of nodes in route from the loader to the specific node.

In a second configuration of the variation described above, the best route includes the maximum received signal strengths in route between the loader and the specific node.

In a third configuration of the variation described above, the best route excludes any route with a received signal strength between any two nodes in the route is below a predetermined level.

In a second variation of the alternative embodiment described above, further the specific node has not been programmed to provide a best route, the specific node responds substantially immediately to receiving notice of the location event, the specific node's response includes the known route of the first notice of location event received by the specific node, and a person with the loader moves toward the specific node in accordance with the response of the specific node to the notice of the location event.

In a second alternative embodiment to the method described above for locating a specific node, further the communication network includes one or more fixed communication nodes whose location is known to the loader prior to any communication between the loader and the network; and after the loader receives the response of the specific node to notice of the location event, the person with the loader moves toward a node whose fixed location is known and that is known to be in the direction of the specific node.

In a variation of the second alternative embodiment just described, further after the person with the loader arrives at the location of the first node whose location was known prior to any communication between the loader and the network, the loader seeks the next node in the route by pinging that node and measuring characteristics of the response. In some embodiments, the pinging is conducted in a "hotter or colder" manner, in which the loader determines if movement is toward or away the next node, and the direction of approach of the person is altered based on this determination. In a configuration of the variation just described, further there are two or more nodes whose locations are known to the loader prior to any communication between the load and the network, and such nodes whose locations are known are arranged in a pattern allowing for ease of searching for a specific node.

In an arrangement of the configuration just described, further the pattern allowing ease of searching is a grid.

In a second configuration of the variation described above, further the pinging uses a communication method that allows for superior execution in the locating of specific nodes.

In an arrangement of the second configuration just described, the communication method that allows for superior execution in the locating of specific nodes is selected from the group consisting of received signal strength, time of arrival, phase of arrival, direct sequence spread spectrum, frequency hopping spread spectrum, wideband and ultra-wideband transmission, triangulation, and geometric location finding. More than one such method may be used, and there may be used any other method that improves the locating of specific nodes.

In a second variation of the second alternative embodiment described above, the nodes whose locations are known form a communication network.

In an alternative embodiment for the method just described for locating a node where other nodes whose locations are known form a communication network, the location of a node whose location is sought, is estimated based on locations of the nodes whose locations are known, and on one or more of the received signal strength from transmissions from one or more communication nodes to the facilitator, time for the facilitator to receive a response from a transmission transmitted from the facilitator to a communication node, number of multipath messages received by the facilitator from a communication node, the angle of arrival of a transmission from a communication node to the facilitator, and the phase of arrival of a transmission from a communication node to the facilitator.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in some embodiments/cases, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for communicating an event in a brush fire communication network, comprising: a first communication node in the network experiencing an event; said first communication node recording the event in a general event log maintained by said first communication node; said first communication node transmitting a message describing the event, wherein said message describing the event includes identification of the first communication node; a second communication node receiving the transmitted message describing the event; said second communication node recording the event in a general event log maintained by said second communication node; and said second communication node amending the message by adding an identification of the second communication mode to the message and retransmitting the message describing the event.

2. The method of claim 1, further comprising: each node in the network creating a general log of communications describing events that are received and transmitted by the node.

3. The method of claim 2, further comprising: each node in the network creating a local group event log based on that node's general log of communications describing events and on the magnitudes of signal strength of messages describing events that are received by that node.

4. The method of claim 3, wherein the magnitude of signal strength of each message describing event that is received by that node is measured by RSSI.

5. The method of claim 1, wherein the event is experienced by only one communication node, that communication node transmits the event, and other communication nodes retransmit the same event.

6. The method of claim 5, in which the event is the change in the operational functionality of the communication node transmitting the event.

7. The method of claim 6, in which the event is a declining life of the battery in the communication node transmitting the event.

8. The method of claim 6, in which the event is a measurement taken by a sensor in communicative contact with the communication node transmitting the event.

9. The method of claim 1, wherein the event is a similar-type event that is experienced by the first communication node and the second communication node, and wherein the amending of the message by the second communication node further comprises changing, by the second communication node, a type of the message to a similar-type event message that indicates a number of communication nodes that experiences the similar-type event.

10. The method according to claim 9 wherein the first communication node is in communicative contact with a first sensor, wherein the second communication node is in communicative contact with a second sensor, wherein the second communication node determines that the first and second communication nodes experiences a similar-type event when (a) the message indicates that the first sensor measured a change in a physical property related to items in an inventory, and (b) the second sensor also measured the change in the physical property related to items in the inventory.

11. The method according to claim 9 comprising receiving the message, from the second communication node, by a third communication node that also experienced the similar-type event, and further amending the message by the third communication node to indicate that the similar type event was experiences by three communication nodes.

12. The method according to claim 9 wherein the similar type event relates to a physical property related to items in an inventory, to an environment of items in the inventory, or to a storage facility.

13. The method according to claim 1 wherein the first communication node belongs to a first group and the second communication node belongs to a group, wherein the message transmitted by the first communication node comprises a first group identifier and wherein the amending of the message, by the second communication node, comprises adding to the message a second group identifier.

14. The method according to claim 1 wherein the amending of the message, by the second communication node, comprises generating a sequence of metadata adding to the message a second group identifier.

15. The method according to claim 1 wherein the event is a measurement taken by a first sensor in communicative contact with the first communication node, wherein the measurement is of a physical property related to items in an inventory, to an environment of items in the inventory, or to a storage facility.

16. The method according to claim 1 wherein the first message comprises a first sequence of fields that comprises a timing of transmission of the message from the first communication node and an identification of the first communication node; wherein the amending of the message comprises adding a timing of transmission of the message from the second communication node and an identification of the second communication node.

17. The method according to claim 1 wherein the network comprises multiple communication nodes, wherein the multiple communication nodes comprise the first communication node, the second communication node and additional communication nodes.

18. The method according to claim 17 further comprises receiving by the network a location message for locating a specific communication node of the network; propagating a plurality of instances of the location message through a plurality of paths in the network; receiving the plurality of instances of the location message by the specific communication node of the network; and responding, by the specific communication node to the plurality of instances; wherein the propagating of an instance of the location message through each path comprises amending, by each communication node along the path, the location message by adding to the message an identification of the communication node.

19. The method according to claim 18 wherein the responding comprises selecting a selected path out of the multiple path and outputting a response message that is indicative of the selected path.

* * * * *